United States Patent [19]

Rothfuss

[11] 3,948,724

[45] Apr. 6, 1976

[54] DEVICE TRAVELING IN NUCLEAR REACTOR ROTARY COVER FOR HANDLING ROD-SHAPED MEMBERS IN THE REACTOR

[75] Inventor: Helmut Rothfuss, Bensberg, Germany

[73] Assignee: Interatom Internationale Atomreaktorbau GmbH, Bensberg, Cologne, Germany

[22] Filed: Jan. 9, 1974

[21] Appl. No.: 431,966

[30] Foreign Application Priority Data
Jan. 20, 1973 Germany............................ 2302831

[52] U.S. Cl................................. 176/30; 214/18 N
[51] Int. Cl.².......................................... G21C 19/20
[58] Field of Search............ 176/27, 37, 30, 32, 87; 214/18 N

[56] References Cited
UNITED STATES PATENTS

| 3,095,102 | 6/1963 | Nadler.................................. 176/30 |
| 3,515,639 | 6/1970 | Pflugrad............................... 176/30 |
| 3,713,550 | 1/1973 | Pugh..................................... 176/30 |

*Primary Examiner*—Samuel Feinberg
*Attorney, Agent, or Firm*—Herbert L. Lerner

[57] ABSTRACT

A device for handling fuel, breeder or absorber rods of nuclear reactors, particularly liquid-metal cooled nuclear reactors, with a hoisting unit situated on a slotted rotary cover and with a remote control grip for grasping the rods, and means for moving the hoisting unit along the slot. Thus, rotation of the cover and movement of the hoisting unit along the slot permits the grip to be moved into position for transfer of any desired rod-shaped member. The slot in the reactor rotary cover as well as the handling device are enclosed by a shielding box.

7 Claims, 3 Drawing Figures

DEVICE TRAVELING IN NUCLEAR REACTOR ROTARY COVER FOR HANDLING ROD-SHAPED MEMBERS IN THE REACTOR

This invention relates to a device for handling rod-shaped members of a nuclear reactor and more particularly refers to a new and improved traveling device for transfer of rod-shaped members in and from a nuclear reaction vessel.

Devices for handling rod-shaped elements in nuclear reactors usually have a hoisting unit which together with a gripping device operates via a number of connecting members such as rods, ropes, chains and the like to move fuel, breeder or absorber rods in and out of the reactor. To be effective, it is necessary to place the gripping device and of course the hoisting unit into a position perpendicular above the rod-shaped member to be moved. In the known devices of this type, this is accomplished via construction involving a main rotary cover with a second smaller rotary cover arranged eccentrically within the main rotary cover, and a hoisting unit disposed on the second smaller rotary cover. Through rotating motions of both rotary covers relative to each other and to the reactor vessel, the hoisting unit may be transported into position above the fission zone of the reactor. Other additional auxiliary equipment must also be affixed to the rotary cover. To accommodate the additional auxiliary equipment and the handling device without interfering with one another during rotary movements of the covers, it becomes necessary to employ large reactor containers with large rotary covers to properly space the appliances. This results in appreciably increased costs which are magnified by the presence of a plurality of rotary covers and their complicated drives.

It is accordingly an object of the invention to provide a device for handling rod-shaped members in a nuclear reactor employing a single rotary cover. Another object of the present invention is to provide a handling device in conjunction with a small reaction vessel of a diameter not substantially greater than the fission zone which it encompasses.

With the foregoing and other objects in view, there is provided, in accordance with the invention, a device for handling rod-shaped members of a nuclear reactor comprising a reaction vessel, a reactor core containing rod-shaped members in the reaction vessel, a rotary cover on the reaction vessel, means for rotating the rotary cover, a slot in said rotary cover, a hoisting unit arranged on said rotary cover, means for moving said hoisting unit along said slot, a grip for grasping a rod-shaped member, transmission means interconnected with said hoisting unit for movement of said grip in the slot, whereby through rotation of said rotary cover and movement of said hoisting unit along the slot, said grip may be moved into position for transfer of any desired rod-shaped member.

In accordance with the invention, the device for handling rod-shaped members is provided with a rotary cover having a slot therein and the hoisting unit disposed on the rotary cover moves along the slot situated in the rotary cover. The intermediate transmission elements connected to the remote control grip move in this slot. The slot may extend over the entire rotary cover or only over a portion thereof, depending on whether the handling device is to be used only for relocating rod members within individual positions of the fission zone or depositing positions adjacent thereto or whether the entire cross section of the reactor vessel is to be accessible.

In a preferred embodiment, the slot is arranged radially in the rotary cover thus obtaining a favorable relation between the length of the slot and the area which is swept by the slot during the rotation of the rotary cover.

gas from shielding box or gas-tight hood is disposed on the rotary reactor cover sealed to the cover to prevent emission of radioactive radiation or protective from the reaction vessel and to prevent penetration of air thereinto. The shielding box should be of ample size to ensure the free mobility of the hoisting unit in its interior.

Movement of the hoisting unit along the slot may be accomplished by means of a carriage or cart on which the hoisting unit rests. To prevent exposure of the hoisting unit and the gripping device to the corrosive effects of the reactor atmosphere particularly from reactors cooled with liquid metal, provision is made for preventing the gaseous atmosphere from the reactor vessel passing up through the slot into the area of the hoisting unit by means of two expansion members such as bellows or other pleated members, connected at one end with the wall of the shielding box and at the other end with the carriage which carries the hoisting unit. The bellows, by acting as a barrier to convection of gaseous currents from the atmosphere of the reaction vessel, protects the hoisting unit against impurities stemming from the reactor atmosphere, which contains for example gas, steam or coolant particles of metal.

Another feature of the invention is the provision of a shielding block inserted from the side to seal the slot thereby making the hoisting unit and the bellows, following the removal of the shielding box, accessible for repair and maintenance work.

Other features which are considered as characteristic for the invention are set forth in the appended claims.

Although the invention is illustrated and described herein as embodied in a device for handling rod-shaped members of a nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
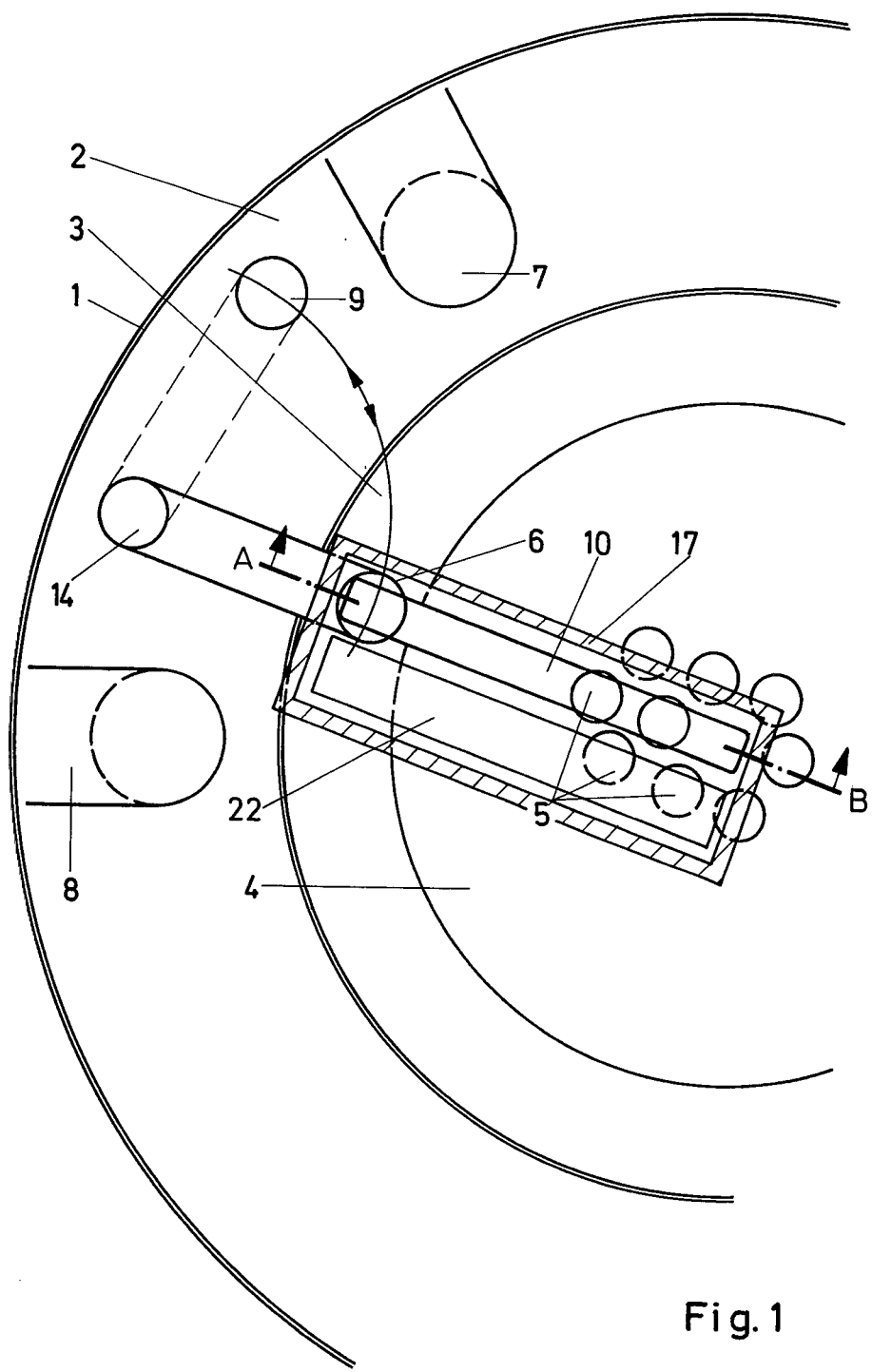
FIG. 1 is a top view of a nuclear reactor with the handling device of the invention, with the shielding box removed, taken along the line C–D in FIG. 3 in the direction of the arrows.
Figure 2:
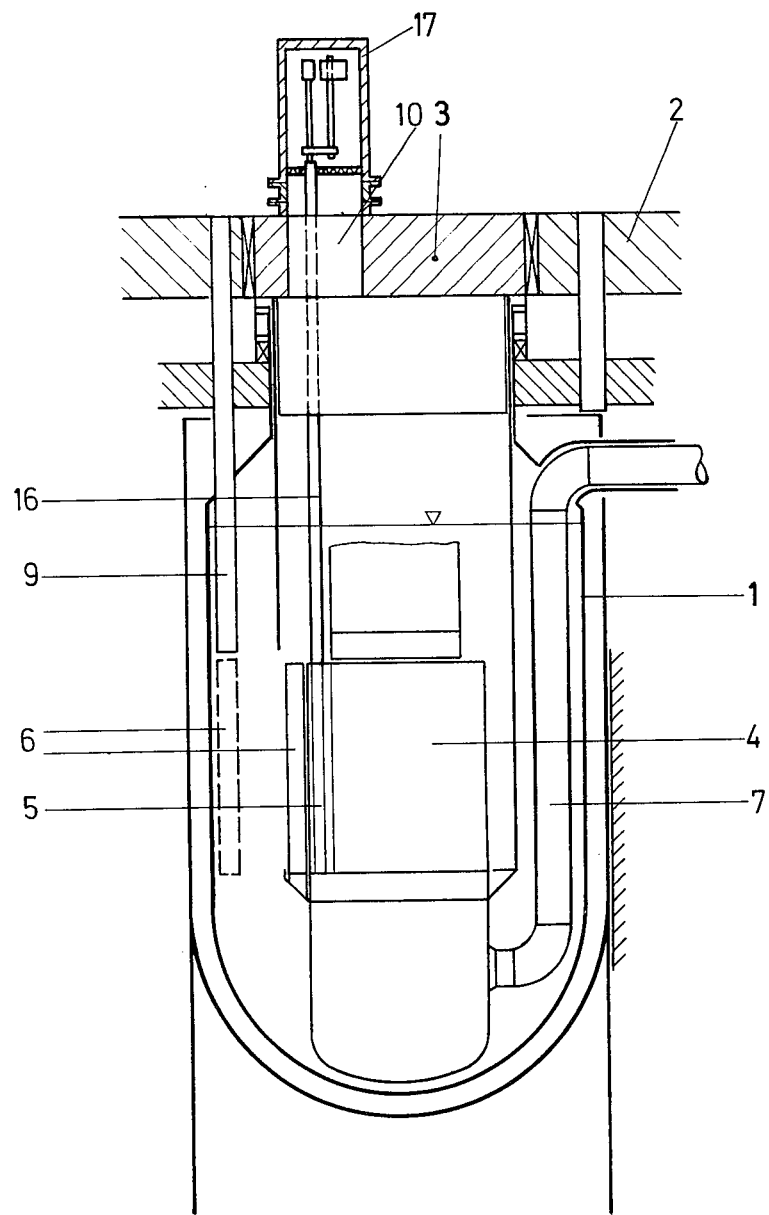
FIG. 2 is a longitudinal axial section through the reactor.

Referring to the drawing, and first particularly to FIG. 1, there is shown a nuclear reactor designated by the numeral 1 with a centrally disposed rotary cover 3 surrounded by a ring-shaped cover 2. The diameter of a rotary cover 3 is only slightly larger than the diameter of fission zone 4 situated beneath the cover. In the fission zone 4 are shown some fuel, breeder or absorber rods designated by the numeral 5. Receptacles or ducts 6 serve as transfer positions into which rods 5 may be moved from the fusion zone and thence outside of the reactor, or conversely rods may first be placed into receptacle 6 and then transfered into the fusion zone. Receptacle 6 also serves as a temporary storage place during rearrangement of rods 5 in fission zone 4. The annular space between the fission zone 4 and the reactor container 1 provides room for various instruments, accessories or fittings for monitoring and controlling the operation of the nuclear power plant, such as, for example inlets and outlets 7 and 8 for the liquid coolant, for the lock ducts 9 for the inlet and outlet of fuel elements 5, etc.

Rotary cover 3 has a radially ending slot 10 through which a gripping device 12 may be lifted through the slot by means of the hoisting unit operated by an electric motor. In this manner the gripping device 12 may be lowered, opened and closed.

Thus through radial movement of the hoisting unit 13 along slot 10 and through rotation of rotary cover 3, the gripping device 12 may be moved into position above any desired rod-shaped member 5. Gripping device 12 after grasping rod 5 may deposit the rod at any other location within the area swept by slot 10, such as, for example in disposal receptacle 6 into which the rod-shaped element may be placed and then transferred if desired, with a crane-like handling device 14, down to below locking duct 9. Receptacle 6 is preferably a movable container into which rod-shaped element is placed and then transported.

Figure 3:
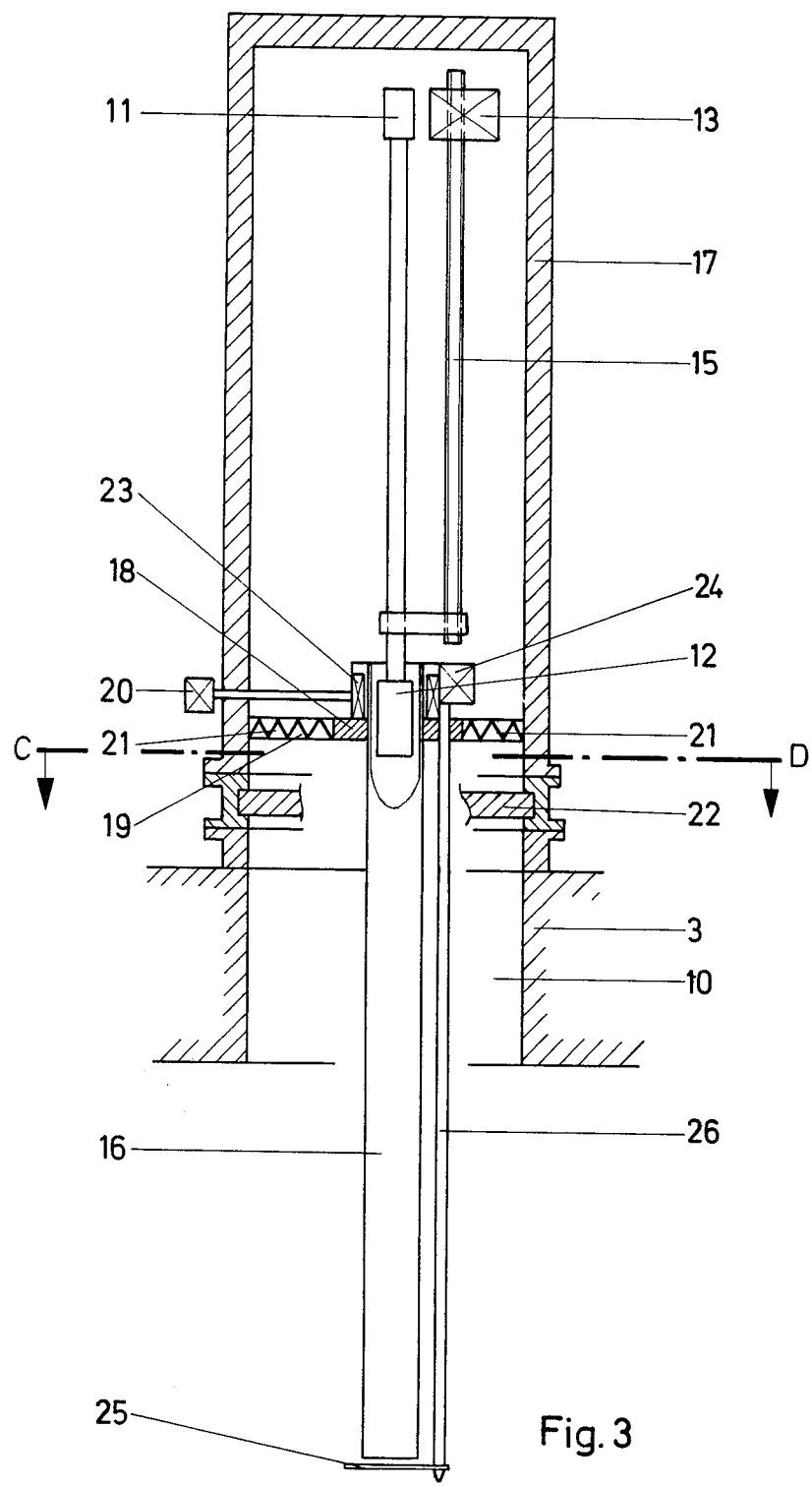
FIG. 3 shows, on an enlarged scale the handling device of the invention and its arrangement in the reactor vessel, in section, taken on line A–B of FIG. 1 in the direction of the arrows.

As shown in greater detail in FIG. 3, the handling device comprises a hoisting unit 13 driven by an electric motor which permits raising and lowering the gripping device 12 via a lead spindle 15. Gripping devices are known and the mechanism for opening and closing the gripping device 12 was omitted in the drawing. Movement of the gripping device downwardly is facilitated by means of guide tube 16 through which it passes. The gripping device and the hoisting unit which moves it are merely illustrative since there are numerous constructions which may be used in the same manner.

Shielding box 17 seated tightly upon reactor cover 3 and covering slot 10 encloses the hoisting unit. Hoisting unit 13 is fastened to carriage or cart 18 which glides in a guide 19 which, in this case, is provided in the wall of the shielding box 17, but which may also be situated in slot 10 proper. Between cart 18 which is moved by an electric motor drive 20, and the wall of the shielding box 17, a bellows 21 i.e. an expansion member such as a pleated member is provided on each side thereof for protecting the area of the shielding box 17 and thus the hoisting unit 13 against the corrosive effects of the reactor atmosphere. The bellows 21 may be sealed by means of loop seals. In order to make the handling device accessible to maintenance work, which necessitates removal of the shielding box 17, a separate shielding block 22 is provided which can be inserted sideways across the slot 10 and which seals the interior of the reactor container 1.

In order to center guide tube 16 more precisely upon a specific fuel rod 5, and in order to control the position of the fuel rod in the fission zone 4, a scanning device may be provided which consists of another electric motor drive 24 which acts via rods 26 upon a rotatable scanning arm 25.

I claim:

1. A device for handling rod-shaped members of a nuclear reactor comprising a reaction vessel, a reactor core containing rod-shaped members in the reaction vessel, a rotary cover on the reaction vessel, means for rotating the rotary cover, a slot in said rotary cover, a hoisting unit arranged on said rotary cover, means for moving said hoisting unit along said slot, a grip for grasping a rod-shaped member, transmission means interconnected with said hoisting unit for movement of said grip in the slot, whereby through rotation of said rotary cover and movement of said hoisting unit along the slot, said grip may be moved into position for transfer of any desired rod-shaped member.

2. Device according to claim 1 wherein said slot is disposed radially in the rotary cover.

3. Device according to claim 1 including a shielding box enclosing said hoisting unit and grip.

4. Device according to claim 3 including a carriage on which said hoisting unit rests, motor means for moving the carriage along said slot, and an expandable barrier between said carriage and the wall of said shielding box to prevent passage of vapors from said reaction vessel into said shielding box containing said hoisting unit.

5. Device according to claim 1 including an insertable shielding block across said slot to seal the interior of said reaction vessel.

6. Device according to claim 1 including an annular ring surrounding said rotary cover.

7. Device according to claim 6 wherein said annular ring has ducts into which said rod-shaped members may be transferred.

* * * * *